US008645772B2

(12) United States Patent
Howard et al.

(10) Patent No.: US 8,645,772 B2

(45) Date of Patent: Feb. 4, 2014

(54) SYSTEM AND METHOD FOR MANAGING UNCERTAIN EVENTS FOR COMMUNICATION DEVICES

(75) Inventors: Edward G. Howard, Crystal Springs, MS (US); Paul A. Reed, Brandon, MS (US); Thomas H. Cobbs, Sandy, UT (US); Tyler C. Poschel, Brandon, MS (US)

(73) Assignee: Itron, Inc., Liberty Lake, WA (US)

( * ) Notice: Subject to any disclaimer, the term of this patent is extended or adjusted under 35 U.S.C. 154(b) by 326 days.

(21) Appl. No.: 12/899,486

(22) Filed: Oct. 6, 2010

(65) Prior Publication Data

US 2012/0054571 A1 Mar. 1, 2012

Related U.S. Application Data

(60) Provisional application No. 61/376,995, filed on Aug. 25, 2010.

(51) Int. Cl.
*G01R 31/28* (2006.01)

(52) U.S. Cl.
USPC .......................................... 714/712; 714/748

(58) Field of Classification Search
USPC .......................................... 714/748–751, 712
See application file for complete search history.

(56) References Cited

U.S. PATENT DOCUMENTS 6,038,212 A 3/2000 Galand et al.
6,628,671 B1 9/2003 Dynarski et al.
6,725,290 B1 4/2004 Glover et al.
6,728,543 B2 * 4/2004 Immonen et al. ............. 455/445
7,075,928 B1 7/2006 Branth et al.
7,240,364 B1 * 7/2007 Branscomb et al. .............. 726/9
7,263,469 B2 8/2007 Bajgrowicz et al.
7,355,509 B2 4/2008 Rennie et al.
7,386,584 B2 * 6/2008 Chen ............................ 709/200
7,646,753 B2 1/2010 Islam et al.
7,714,705 B2 5/2010 Rennie et al.
7,800,873 B2 * 9/2010 Batko et al. ..................... 361/42
8,207,638 B2 * 6/2012 Toyama et al. ............... 307/151
2001/0056503 A1 12/2001 Hibbard
2006/0041402 A1 * 2/2006 Baker .......................... 702/189
2006/0187885 A1 8/2006 Roy et al.
2008/0137553 A1 6/2008 Hsu et al.
2009/0069008 A1 * 3/2009 Highsmith et al. ........... 455/424
2010/0029322 A1 * 2/2010 Englund et al. ............... 455/522

OTHER PUBLICATIONS

Huawei "HARQ process Id of DL persistent scheduling,"3GPP Draft; R2-082215, 3rd Generation Partnership Project (3GPP), Apr. 29, 2008.*

* cited by examiner

*Primary Examiner* — Guy Lamarre
(74) *Attorney, Agent, or Firm* — Hanley Flight and Zimmerman, LLC

(57) ABSTRACT

In one or more embodiments, an intelligent communications device is disclosed. In one embodiment, an apparatus for managing a network connection of the intelligent communications device is disclosed. The apparatus includes a communication module for monitoring the network connection through a first port that is independent of a network port. The first port is associated with a computer-executable application that is operative to detect failure of the network connection. The apparatus further includes a detection module for detecting a failure of the network connection at the network port and, in response to the failure, causing the intelligent communications device to reconnect to the network. The apparatus also includes a power supply module for iteratively power-cycling operation of the intelligent communications device in response to a failed network connection.

14 Claims, 9 Drawing Sheets

SYSTEM AND METHOD FOR MANAGING UNCERTAIN EVENTS FOR COMMUNICATION DEVICES

CROSS REFERENCE TO RELATED PATENT APPLICATION

This application claims the benefit, pursuant to 35 U.S.C. §119(e) of U.S. provisional Application Ser. No. 61/376,995, filed Aug. 25, 2010, entitled "System and Method for Managing Uncertain Events for Communication Devices" by Edward G. Howard, Paul A. Reed, Thomas H. Cobbs, and Tyler C. Poschel, the disclosure for which is hereby incorporated by reference in its entirety.

FIELD OF THE INVENTION

The present invention generally relates to network routers, and more specifically to an intelligent communications device for a smart grid, hereinafter also referred to as an "apparatus" or "network apparatus", for managing interconnection of various electrical devices and facilities.

More particularly, the present invention relates to managing uncertain events for intelligent communication devices.

SUMMARY OF THE INVENTION

In one aspect, the present invention relates to a system and method for controlling operation of a plurality of electronic devices in a smart grid. In one or more exemplary embodiments, an intelligent communications device is operatively connected with other devices and/or systems and one or more electrical distribution networks. One or more of these electronic devices may work in collaboration with the intelligent communications device in a smart grid network infrastructure. In one or more embodiments, the electronic devices may be arranged in various configurations to operate in networks such as LAN, WAN, and/or HAN networks.

In one embodiment, the intelligent communications device is configured with other devices and/or monitoring equipment for monitoring and management of electrical energy consumption. The intelligent communications device operates on wireless communications networks and according to one or more wireless protocols such as commercial cellular, Bluetooth, and/or 802.11.

In one embodiment, the intelligent communication device is field upgradeable, and is configured such that additional hardware can be installed for enabling new protocols or technologies to be developed. The intelligent communications device is operative to implement open source software configured to facilitate integration of different types of devices with additional circuitry and/or hardware. Further, the intelligent communications device is operable to update the open source software periodically or at a pre-defined time.

In another aspect, the present invention relates to an apparatus for managing a network connection of an intelligent communications device.

In yet another aspect, the present invention relates to a computer-implemented method for monitoring, establishing, and maintaining a network connection of an intelligent communications device in a communications network.

In yet another aspect, the present invention relates to computer-readable medium having stored computer-executable instructions which, when executed by one or more processors, perform operational steps for managing a network connection in a communications network.

DETAILED DESCRIPTION OF THE INVENTION

Description of the various embodiments detailed below is for understanding the invention. It will be understood that the invention is not limited to the particular embodiments described herein, but is capable of various modifications, rearrangements and substitutions, which will now become apparent to those skilled in the art without departing from the scope of the invention. Therefore, it is intended that the following claims cover all such modifications and changes that fall within the spirit and scope of the invention.

In alternative embodiments, system, process, and apparatus may include additional, fewer, or different components. In addition, the each component may include additional modules, software, and interface devices that may be appended on requirement to operate the present invention in alternate embodiments.

Figure 1:
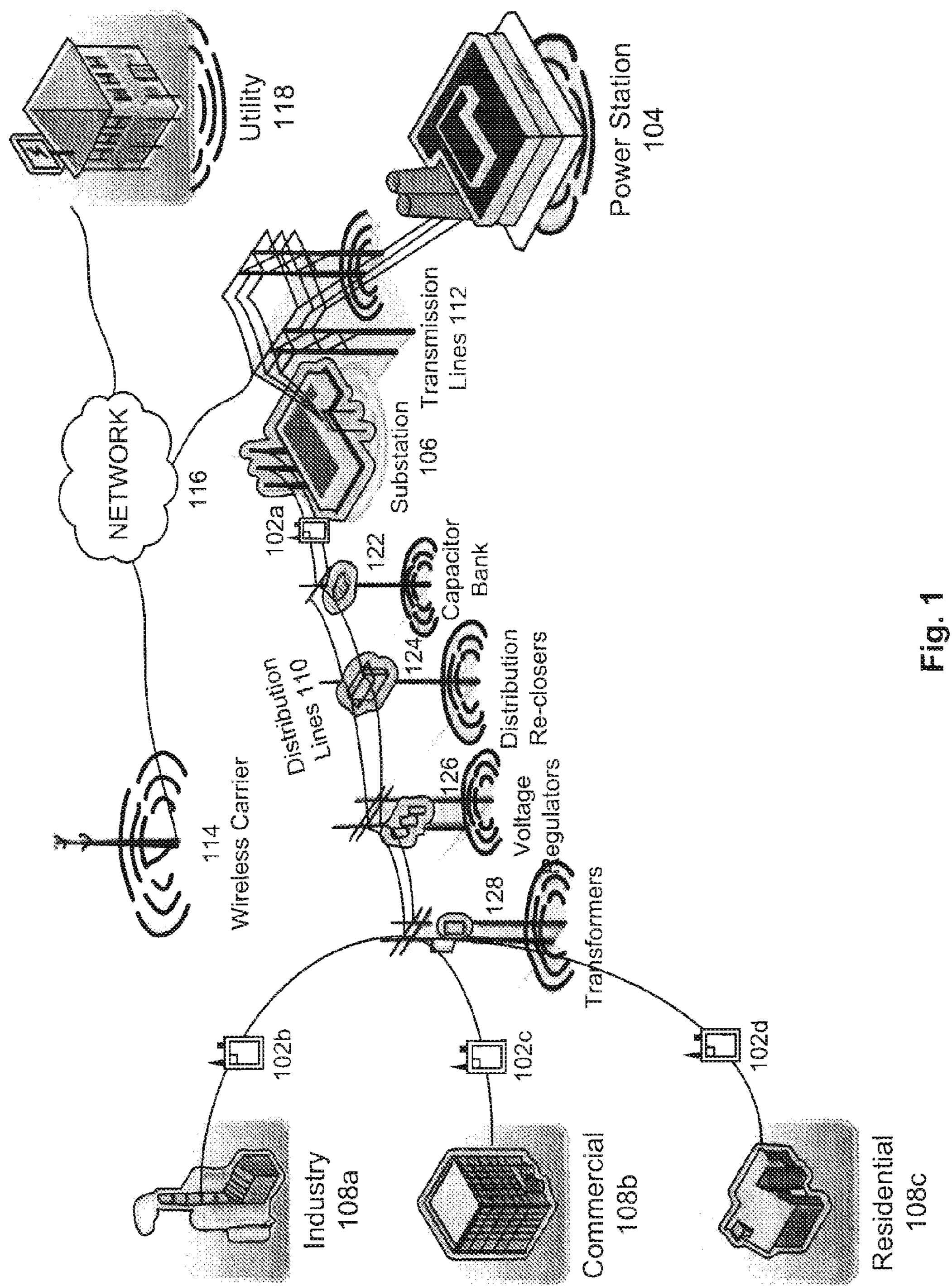
FIG. 1 is a schematic illustration of an overall environment in which one or more aspects of the present invention can be practiced.

Referring to FIG. 1, an intelligent communications device for a smart grid communicatively coupled to a plurality of devices and/or facilities for management of energy requirements is depicted. Integration of the intelligent communications device 102 into the smart grid infrastructure may be performed using minimal capital expenditure.

FIG. 1 illustrates an environment in which the present invention may be practiced. The environment may include a plurality of electrical generation facilities such as thermal power plants, hydro-based power plants (dams, for example), solar powered electricity generation units, and wind powered electricity generation units. Various electricity-generating plants are collectively referred to as power generation units 104. The electricity generated from the power generation units 104 may be distributed through a plurality of high voltage transmission lines 112 to a substation 106. For example, high voltage electricity may be distributed via plurality of towers and a plurality of medium voltage distribution cables 110.

By way of example and not a limitation in one implementation, the substation 106 may receive power from the plurality of high voltage transmission lines 112 from at least one of the plurality of substations such as power station 104. Further, the substation 106 may be associated with an intelligent communications device 102. The intelligent communications device 102 may monitor various parameters such as quality of electricity and electrical load.

The substation 106 may then distribute low voltage electricity to residential entities 108*c*, industrial entities 108*a*, and/or commercial entities 108*b*. The medium voltage distribution lines 110 may include attachments of various devices for improvement of quality electricity. As such, the plurality of distribution lines 110 may run moderate distances and are affected by cable resistance, electrical grid loading, and other factors which constantly effect the operation and efficiency of the electric grid. In order to compensate for a variety of operating conditions, the plurality of distribution lines 110 may include connections to capacitor banks 122, distribution re-closers 124, voltage regulators 126, transformers 128 and other types of equipment.

The electricity may be supplied to the one or more industrial entities such as industry 108*a*, via intelligent communications device 102*b*. Likewise, the plurality of distribution lines 110 may feed electricity to one or more commercial entities such as commercial entity 108*b*, one or more residential entities 108*c*, through intelligent communications devices 102*c* and 102*d*. Hereinafter, intelligent communications devices 102*a*, 102*b*, 102*c*, and 102*d* may be collectively referred to as "intelligent communications device 102."

The intelligent communications device 102 may be configured to operate with a central control station, regulatory authority, audit compliance authority, and/or electrical monitoring systems. Apart from monitoring the various parameters such as electrical quality, the intelligent communications device 102 may be coupled wirelessly to a plurality of wireless carriers such as 114. Alternatively, the intelligent communications device 102 may be coupled with communications network 116 using powerline communication. Further, the wireless carrier 114 may receive signals that may be utilized for moderating the distribution of electricity from the substation 106 to industrial entity 108*a*, commercial entity 108*b*, and/or residential entity 108*c*.

The intelligent communications device 102 may be connected with a plurality of utilities in a building, a commercial complex, and/or an industry. By way of example and not a limitation, in one implementation, intelligent communications device 102 may be connected to utility 118. In an embodiment, the utility 118 may include lighting systems, refrigerators, air conditioners, computers, televisions, home theaters, electric irons, water filters, air filters, air compressors, and/or vacuum cleaners. The intelligent communications device 102 may directly control the utility 118. In another embodiment, one or more intelligent communications devices 102 may indirectly control the utility 118. In yet another embodiment, the utility 118 may be partially controlled by one or more intelligent communications devices 102 for modulating the electrical consumption. It may be noted that only one implementation is provided; however, those skilled in the art would appreciate that various other implementations are possible without deviating from the scope and spirit of the invention.

The utility may be grouped into essential and non-essential electrical equipment for purposes of control. In this embodiment, the intelligent communications device 102 may be programmed to monitor the one or more utilities 118 on a rule based program.

In an embodiment of the present invention, the intelligent communications device 102 may be coupled to multiple consumers such as industrial entities 108*a*, commercial entities 108*b*, and residential entities 108*c*. The consumer 108*a*, 108*b*, and 108*c* may be hereinafter collectively referred to as 'consumers 108'. The intelligent communications device 102 may facilitate management of electricity to one or more consumers 108. Additionally, the intelligent communications device 102 may also be integrated to communications backhaul providers that may work in synchronization for accumulating data related to electrical consumption, load distribution, quality of electricity, power factor, and/or failure of equipment associated with the distribution of electricity. The information may be communicated to control and monitoring station, either through the network 116 or through wireless carriers 114.

In an embodiment of the present invention, the consumers 108 may be distributed in a geographically area and may be connected to each other through a smart grid. In addition, each consumer 108*a* may have one or more smart appliances. The smart appliances may be managed by the intelligent communications device 102 for optimizing electricity consumption.

Figure 2:
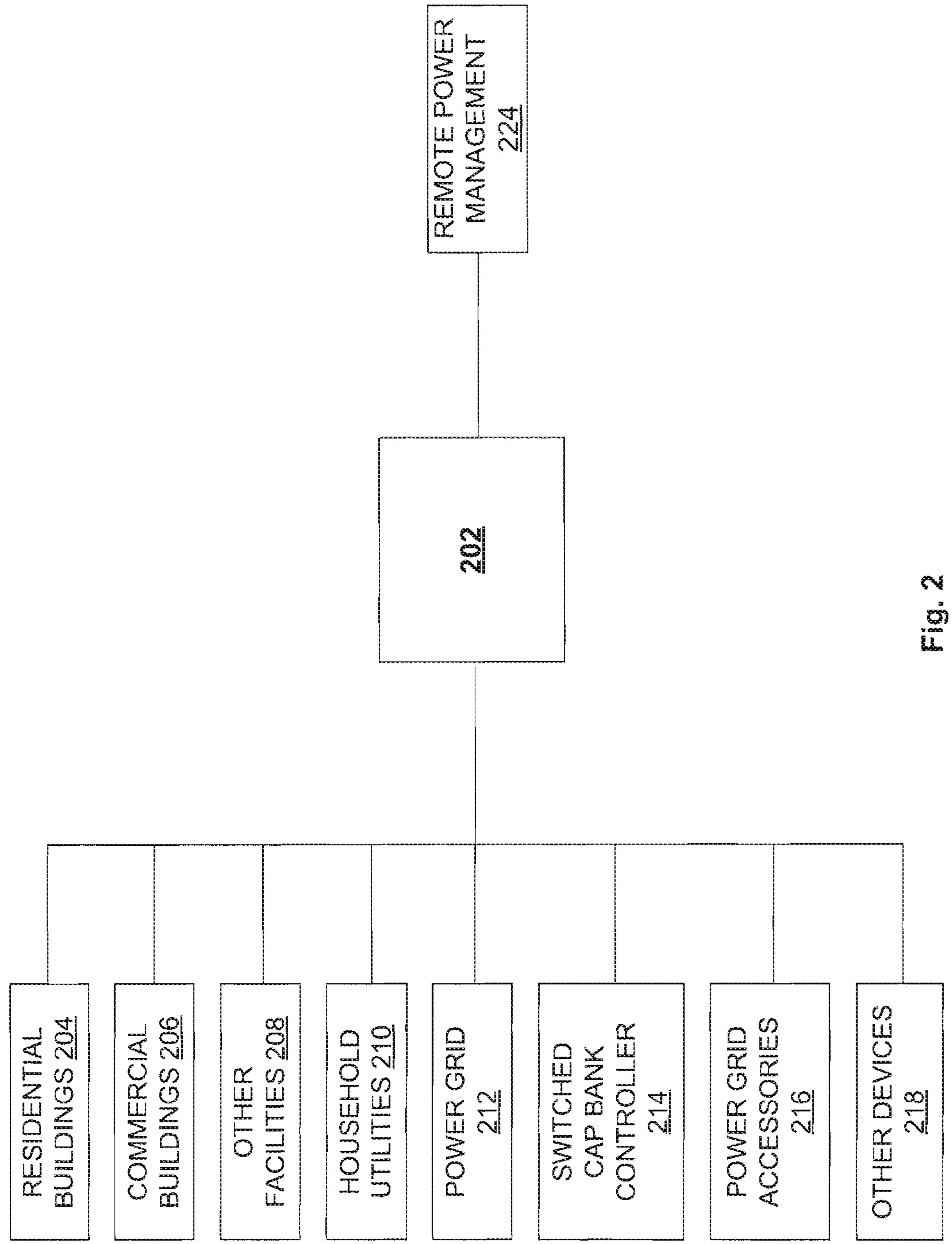
FIG. 2 depicts various facilities, devices and equipment interfaced with an intelligent communications device according with one embodiment of the present invention.

Referring to FIG. 2 an arrangement of configuring various electrical facilities with an intelligent communications device 202 is shown, according to one embodiment of the present invention. The intelligent communications device 202 may communicate with the plurality of devices and/or facilities, such as but not limited to, residential buildings 204, commercial entities 206, other facilities 208, household utilities 210, power grids 212, switched cap bank controllers 214, grid accessories 216, other devices 218, and remote power management utilities 224. Other facilities 208 may include but not limited to schools, small offices, sports complexes, shops, malls, federal offices, utility complexes, or other types of buildings having electrical connection and consuming electricity. The intelligent communications device 202 may facilitate energy management for one or more of the devices and/or facilities as shown.

Power Management

In an embodiment of the present invention, the intelligent communications device 102 may enable distribution companies to reduce the overall power requirement through better management. This in turn may help in reducing the need for power generation thereby reducing environmental damage. Further, the intelligent communications device 102 may act as a communications hub for monitoring electrical usage, power consumption, quality of electricity, and/or analysis of electrical load, where examples of load type may include inductive load and/or capacitive load. The communications hub may interface various devices in order to monitor electricity consumption and/or power usage.

The intelligent communications device 102 may enable integration of various utilities with the grid for optimizing the overall performance of the system. For example, the load requirement of a particular building may be assessed/monitored using the intelligent communications device 102. The data collected by the intelligent communications device 102 from the various utilities may be utilized for improving the overall electrical consumption of these utilities thereby saving cost and electricity. Alternatively, the intelligent communications device 102 may monitor the performance of different electrical utilities and may facilitate their management in an optimized way.

In another embodiment, the intelligent communications device 102 may be utilized by distribution companies for monitoring the quality of electricity and load characteristics for a specific area. The data recorded by the intelligent communications device 102 may be utilized for increasing the operational efficiency of the power grid.

In another embodiment, the intelligent communications device 102 may facilitate management of demand response for a grid. Currently, power generation and/or power distribution companies face pressure to reduce load either electronically or manually. In such settings, transmission grid operators use demand response to request load reduction in order to manage demand. One or more aspects of the present invention according to this exemplary embodiment allow for transmission grid operators to utilize the intelligent communications device 102 for electronically managing the demand response of electricity.

Integration with Power Grid

In one embodiment, the intelligent communications device 102 may include a communication module for connecting it with a smart grid. In this aspect, the intelligent communications device 102 may increase the performance of the smart grid making it more adaptable and cost effective. In addition, the intelligent communications device 102 may enable utilities to interface with the grid irrespective of the underlying technology, network, or assets. The intelligent communications device 102 may be flexible to accommodate any configuration changes and/or bandwidth changes without affecting the underlying architecture/technology.

In another embodiment of the present invention, the intelligent communications device 102 may communicate with other apparatuses. The communication may be either wireless or through wired connection. Such communication may occur in response to a critical event such as power surge, excess demand, low power factor, when immediate action is required for safeguarding the electrical equipments associated with transmission infrastructure. In another embodiment, the communication between different apparatuses may occur on a continuous basis for optimizing the performance of the system.

Field Upgradability

In another aspect of the present invention, the intelligent communications device 102 may be field-upgradeable and may provide field replaceable units for preventing obsolescence. The intelligent communications device 102 may allow utilities to add multiple communication technologies to the smart grid communication infrastructure with change of the underlying technology. By integrating multiple communication technologies, the intelligent communications device 102 may act as a universal hub, to reduce the cost of purchasing additional equipment for implementing multiple network communications protocols. Consumers 108 may integrate multiple appliances and multiple communication technologies using intelligent communications device 102 thereby reducing the total cost of ownership of the equipment. Additionally, consumers 108 may upgrade the intelligent communications device 102 to integrate new communication protocols by just installing additional circuitry without changing existing equipment.

The intelligent communications device 102 may further include a software update module that may connect to the Internet for availability of firmware updates. In response to availability of firmware updates, the software update module may back-up the current firmware before upgrading the intelligent communications device 102 with the new firmware. Failure to implement the new firmware may result in reinstallation of the old firmware from the back up.

In another embodiment of the present invention, the intelligent communications device 102 may include additional slots for inserting PCB boards. These PCB boards may include circuitry for enabling specific protocol, for example, the PCB on PCB board may implement EDGE protocol. Similarly, in another example, a PCB board may implement WiMax protocol. Field service personnel may insert additional PCB boards for upgrading the existing communication protocol without having to replace the intelligent communications device 102. Thus, the intelligent communications device 102 may be upgraded while in operation.

In another embodiment of the present invention, the intelligent communications device for a smart grid may include PCB boards supporting various communication technologies such as but not limited to, WiMax, EDGE, IPv4/IPv6, Bluetooth, Infrared, broadband over powerline, and Ethernet. Software configured in the intelligent communications device 102 may be utilized to enable/disable one or more communication boards. Thus, in one implementation, the apparatus may support Ethernet. In another implementation, the intelligent communications device 102 may support Ethernet and Bluetooth. In these scenarios, the field service personnel may update the intelligent communications device 102 by enabling the boards supporting various communication technologies remotely.

In yet another embodiment of the present invention, the intelligent communications device 102 may include utilities, circuitry for upgrading it on site. Further, the intelligent communications device 102 may include software and/or modules for adding multiple communication technologies to the smart grid communications infrastructure based on future needs without having to replace an entire system backbone. By virtue of having capabilities for adding new devices and facilities, the intelligent communications device 102 may allow consumers to purchase and integrate non-interoperable proprietary technologies from multiple vendors. Vendors may integrate heterogeneous devices using intelligent communications device 102 thereby creating an open environment. In this aspect, the intelligent communications device 102 may allow for consumers to avoid being committed to a specific vendor.

Consumption Monitoring

Consumers of electricity may save money by planning their energy requirements in area implementing Time-Of-Use (TOU) pricing. Consumers may plan the use of electrical appliances in off-peak hours, when the cost of electricity is less, for reducing the total cost of electricity consumption. The intelligent communications device 102 may facilitate the reduction in total consumption of electricity by automatically switching on the electrical appliances in non-peak hours.

Network Protocol Implementation

The intelligent communications device 102 may be based on Internet Protocol (IP) thereby providing seamless integration with different type of networks. For example, the intelligent communications device 102 may facilitate communication with both public and private networks. In embodiments, the network may be either a wired network or a wireless network. Further, networks classified on the basis of scale, such as LAN, WAN, HAN, or functional relationships, such as client server, peer-to-peer, and/or active networks, overlay networks are included within the scope the invention. In an exemplary embodiment, the intelligent communications device 102 communicates using TCP/IP. Likewise, the intelligent communications device 102 may interface with other devices implementing conventional protocols.

The intelligent communications device 102 may facilitate smart grid-enabled appliances to communicate wirelessly with electrical distribution companies to manage their overall consumption of electricity. For example, the intelligent communications device 102 may manage consumption of electricity during peak hours for a distribution network. In this aspect, the intelligent communications device 102 may communicate in real-time with various facilities and other devices to optimize energy efficiency.

In an embodiment of the present invention, the intelligent communications device 102 may include an Ethernet interface for connecting it with external network such as LAN, WAN, or HAN. Further, the Ethernet interface may enable communication with Internet thereby facilitating remote management of utilities. The intelligent communications device 102 may record various parameters such as electricity consumption, power usage and may transfer the recorded data to the remote infrastructure management facility for optimization of the electrical consumption. To this end, the intelligent communications device 102 may enable optimum utilization of the grid infrastructure. The intelligent communications device 102 may be built for outdoor use and may be protected from environmental hazards.

The intelligent communications device 102 may be capable of interfacing with various protocols, networking standards, and other specifications. In an example, the intelligent communications device 102 may facilitate communication by implementing WiMax protocol. In another example, the intelligent communications device 102 may communicate using Bluetooth protocol. In embodiments, the intelligent communications device 102 may communicate using other protocols such as but not limited to token ring, EDGE, UDP, datagram and other proprietary Internet communications protocols. In an example, the intelligent communications device 102 may facilitate communication with ZigBee protocol that allows devices in the home to communicate with a smart meter and neighborhood hub.

In an embodiment of the present invention, the electrical distribution companies may analyze the electrical consumption data collected over a specified period for better management of energy. The intelligent communications device 102 may include a communication link with a database for storing electrical consumption data. In an embodiment, the specified period may be an hour, a day, a month, a year, or any combination of these.

The intelligent communications device 102 may facilitate interoperability among smart grid devices, thereby facilitating seamless deployment of smart devices in a smart grid. In this aspect, various smart devices including smart appliances and smart meters may work in harmony with the intelligent communications device 102. Thus, the intelligent communications device 102 may integrate into the existing smart grid deployment without competing with other existing devices. Alternatively, it may enhance the capability of other smart devices. In an embodiment of the invention, the intelligent communications device 102 may allow integration with other devices without the need for installing additional devices and/or interface circuitry. The smart devices can be configured with the intelligent communications device 102 for management of smart appliances for increasing the operational efficiency of the smart grid. Smart appliances refer to the class of products that enable communication with smart meters and neighborhood hub for saving energy.

The intelligent communications device 102 may enable Internet Protocol based communication involving end-to-end connectivity on a public wireless network. The intelligent communications device 102 may further facilitate two-way delivery of real-time energy usage data over a public wireless network. In an embodiment, the real-time data may include location information along with energy usage information.

In an embodiment of the present invention, the intelligent communications device 102 may include one or more communication ports for connecting to different types of communication devices. The intelligent communications device 102 may include switches, hubs or other interface circuitry for coupling with the external devices. Additionally, the intelligent communications device 102 may include a wireless communication module for connecting with wireless appliances and/or smart devices. In this aspect, the wireless devices such as smart appliances may be enabled by low power protocol such as 6 LOWPAN. Alternatively, the wireless devices may be enabled using Bluetooth, EDGE, IEEE 802.11, and/or infrared.

Open Standards Implementation

The intelligent communications device 102 may implement open standards to leverage existing programs and tools. In this aspect, the intelligent communications device 102 may facilitate rapid application deployment and delivery of the new functionality. For example, the intelligent communications device 102 may update the applications and/or programs in real time. Additionally, updates corresponding to programs and/or applications may be executed at a predefined time in order to update the software, drivers, interface ports, applications. This may ensure that the intelligent communications device 102 may be fully equipped to deny any security attack on it. In another example, interfacing a new smart device with the intelligent communications device 102 may initiate a search for software. Failure to discover appropriate software may result in searching the required software at a remote location such as the Internet. Thus, the intelligent communications device 102 may perform self-healing by automatically scanning and integrating new devices and/or facilities in the smart grid infrastructure.

Enclosure

Figure 3A:
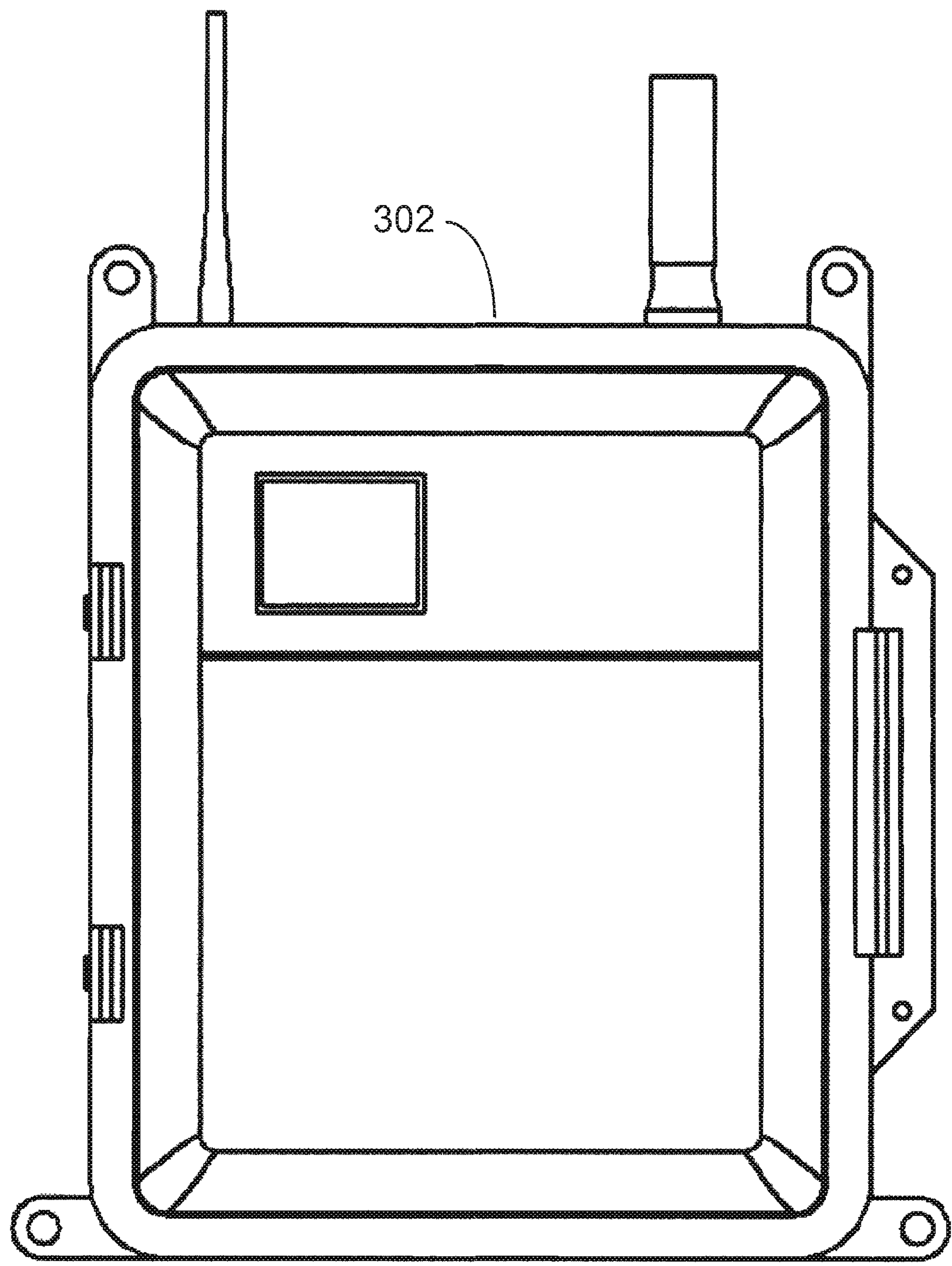
FIG. 3 depicts various modules associated with an intelligent communications device according to one embodiment of the present invention.

Referring to FIG. 3A, an outer enclosure 302 associated with the intelligent communications device 102 is shown, according to one embodiment of the present invention. The intelligent communications device 102 may be enclosed in proper casing 302 for rapid deployment. In this embodiment, the modular and compact design of the intelligent communications device 102 may protect it from damage during installation. The modular design may further enable rapid installation of intelligent communications device 102. For example, the compact modular design may facilitate installation of the intelligent communications device 102 within a small space.

In embodiments, the enclosure may be fabricated from metal, plastic, and other materials, which may be combined.

The compact modular design of the enclosure may be modified for installation in hazardous areas such as refineries, gas plants, and CNG stations. Special enclosures may be provided for installing the intelligent communications device 102 in hazardous areas. In an embodiment of the present invention, the casings and/or enclosures may facilitate a long operational lifetime of the intelligent communications device 102.

Figure 3B:
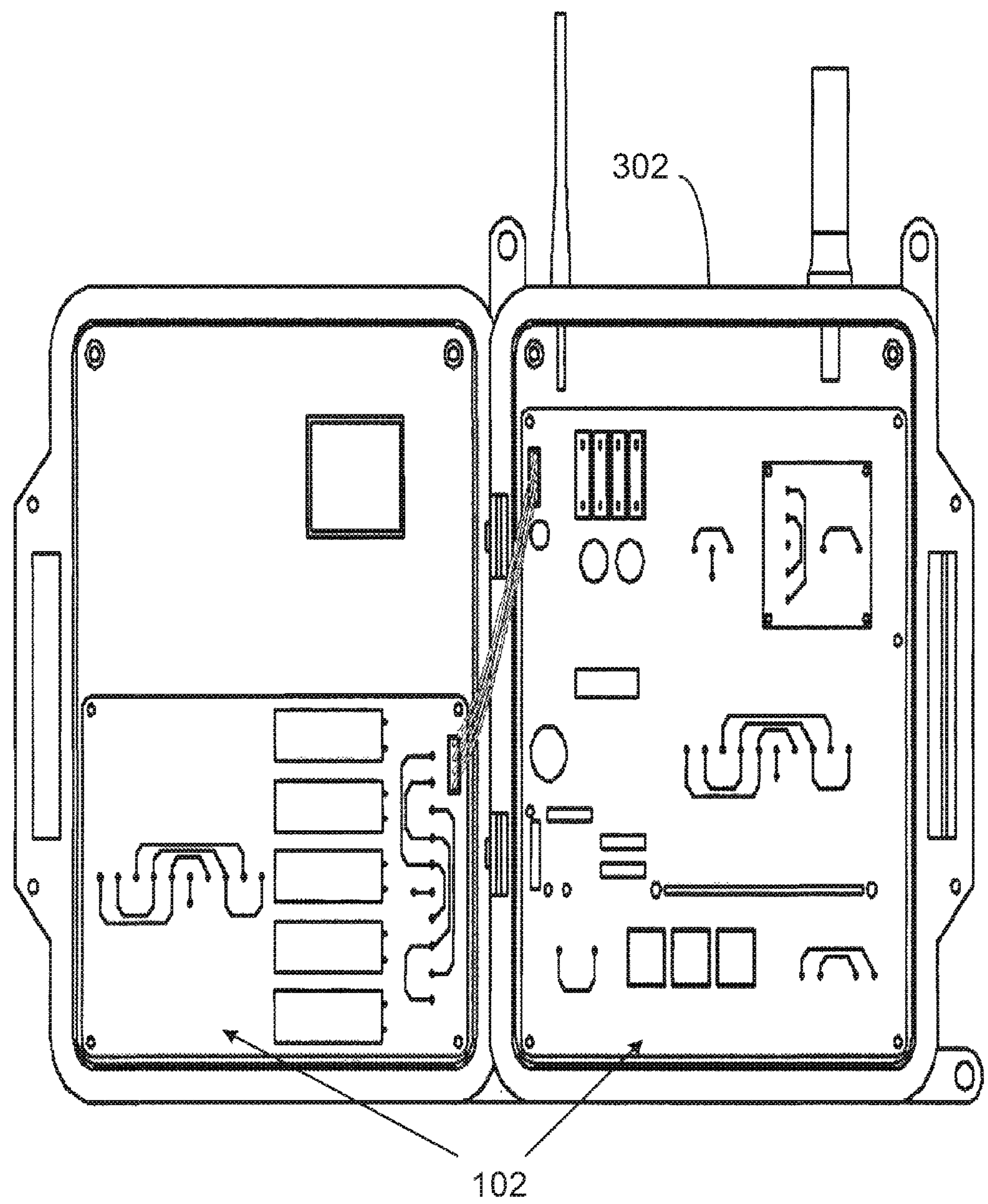

FIG. 3B depicts various circuit boards of the intelligent communications device 102 embedded in the enclosure 302 for safety. The enclosure may include circuitry 306, 308 to raise an alarm if the enclosure is tampered with by an unauthorized entity. Additionally, a provision may be provided in the apparatus that may intelligently determine if the enclosure is opened for repair through an authorized entity.

Management Tools

The intelligent communications device 102 may be interfaced with standard off-the-shelf network management tools. In an embodiment of the present invention, the management tools may be integrated in one or more utilities. Alternatively, the management tools may be implemented on computing devices such as personal computers, servers, and/or electrical control panels.

The intelligent communications device 102 may work in harmony with other smart devices in order to create a seamless infrastructure and to enhance the capability of the smart grid infrastructure. Thus, the intelligent communications device 102 may allow reclosers from one vendor to be integrated with the electronic meters from another vendor for building a collaborative smart grid infrastructure.

The intelligent communications device 102 may implement open source and may facilitate two-way delivery of real-time energy usage data over public wireless network. Further, the open source may simplify deployment of the smart devices in a smart grid infrastructure.

Security Features

In an embodiment of the present invention, the intelligent communications device 102 may secure communication between the intelligent communications device 102 and the external smart devices. For this purpose, the intelligent communications device 102 may implement various security algorithms as known in the art, including IP security and cryptography for secure transfer of data. Internet Protocol Security (IPsec) is a protocol suite for securing Internet Protocol (IP) communications by authenticating and encrypting each IP packet of a data stream. In another embodiment, the intelligent communications device 102 may implement RSA algorithm for securing data transfer.

In embodiments, the intelligent communications device 102 may facilitate collaboration between various interconnected equipment in the smart grid infrastructure. For example, the intelligent communications device 102 may facilitate collaboration between groups of consumers. In another example, the intelligent communications device 102 may facilitate collaboration between different electrical appliances belonging to a particular consumer. In yet another example, the intelligent communications device 102 may facilitate optimization and collaboration of electricity usage related to a particular electrical appliance, for example, a consumer washing machine.

The transmission aspect may be focused on surveillance, fault management, and/or voltage regulation, among others. The intelligent communications device 102 includes software and/or applications for monitoring and surveillance, fault management, and/or voltage regulation. Reports of unusual activity detected by the intelligent communications device 102 may be forwarded to a control station or to security staff via alert. The recorded data may be recorded in a log file, which may be forwarded to the concerned authority in real-time for remedial action. Alternatively, the intelligent communications device 102 may, based on its own capability, resolve the issue without raising an alert.

The distribution aspect may include among other aspects monitoring and management of switches, meters, and/or reclosers. The intelligent communications device 102 may allow integration of various devices into seamless smart grid configuration. For example, a meter from one vendor may be configured with the recloser from another vendor. By implementing open standards in the intelligent communications device 102, the distribution companies can focus on building the smart grid infrastructure without worrying about the product working on a dedicated technology, since the intelligent communications device 102 may act as a universal hub for integrating various technologies.

A consumer may utilize the intelligent communications device 102 for conserving electrical consumption. In this aspect, consumer devices may be directly connected with the intelligent communications device 102. Exemplary consumer devices may include transformers, fault management devices, power meters, water meters, gas meters, load limiters, and disconnect switches. The intelligent communications device 102 may manage these smart devices in an optimum manner for saving electricity.

Solar Power

In an embodiment of the present invention, the intelligent communications device 102 may be solar powered. The outer enclosure of the intelligent communications device 102 maybe fitted with photovoltaic cells that may receive solar energy. The solar energy may be utilized to charge one or more batteries; the charged batteries may allow communication with utility management infrastructure even during a power failure. Thus, the apparatus may work continuously without interruption.

Solar power may be further utilized to provide power for critical activities during a power failure, such as clock, wireless facility, memory and other communication circuitry.

Computer-Executable Software Embodiments

In an embodiment of the present invention, the intelligent communications device 102 may include software and hardware for implementing virtualization. For example, the intelligent communications device 102 may implement hardware virtualization. Implementing virtualization may facilitate the process of disaster recovery, induce higher levels of abstraction, and increased level of security.

In yet another embodiment of the present invention, the intelligent communications device 102 may include software for implementing distributed computing architecture. For example, various software processes may communicate with databases/repositories of the central control station to periodically update the repositories and/or databases. Such an arrangement may reduce the probability of loss of data during disaster and/or failure of other equipment.

In yet another embodiment of the present invention, the software-implemented multiple processes enable processing of data in real time. In this aspect, the software executed by the associated processor may spawn multiple threads for faster execution and real-time monitoring of the utilities. Such implementation may facilitate quick response to adverse events, thereby reducing the probability of failure of the overall infrastructure.

Figure 3C:
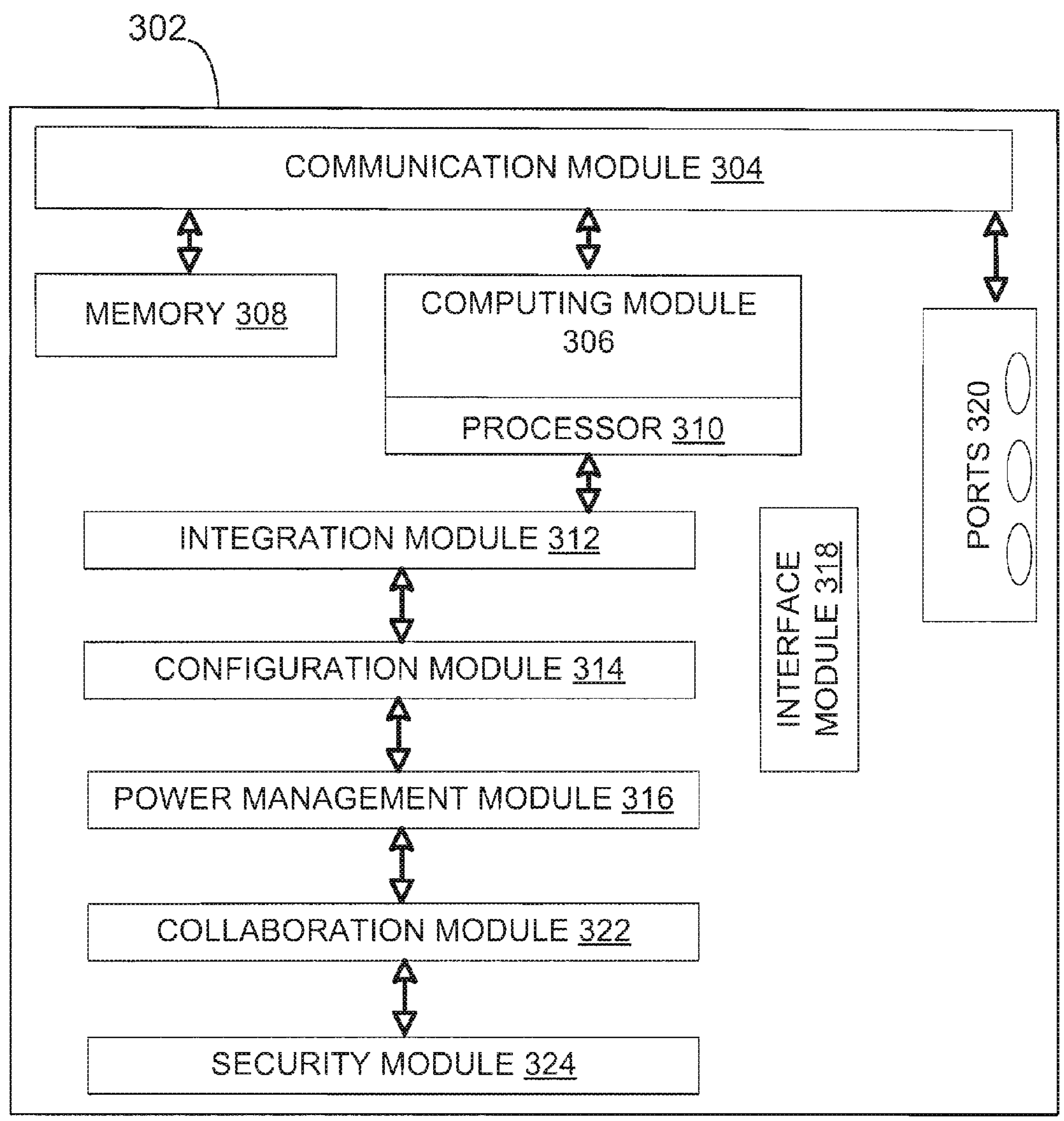

Referring to FIG. 3C, the intelligent communications device 102 may include an enclosure 302, a communication module 304, a memory 308, and a computing module 306 having a processor 310. The communication module 304 may be coupled with the memory 308 and to the computing module 306. In addition, the computing module 306 may be associated with the integration module 312 as well as interface module 318. The smart devices and/or facilities may be attached at one or more ports 320. The data received at one or more ports 320 may be forwarded to an integration module 312, a configuration module 314, a power management module 316, and the collaboration module 322. Additionally, smart devices may be incorporated into the smart grid infrastructure using a collaboration module 322.

In an embodiment of the present invention, addition of a device at one of the ports 320 may initiate integration of the device into the smart grid infrastructure. The signal received from the device may be forwarded to the interface module 318 to determine the type of device, attributes, and other details for integration with the intelligent communications device 102. Once the parameters of the devices have been ascertained, the integration module 312 and the configuration module 314 may facilitate integration for incorporating the device into the smart grid infrastructure. For example, the configuration module 314 may search for device drivers, applications and other software that may enable smooth adaptation of the device into the smart grid infrastructure.

In an embodiment of the present invention, a security module 324 may secure communication between the external smart devices and/or various facilities. For example, the security module may use encryption techniques known in the art for protecting data. Likewise, different security protocols may be implemented by the security module 324 for protecting data.

Figure 4:
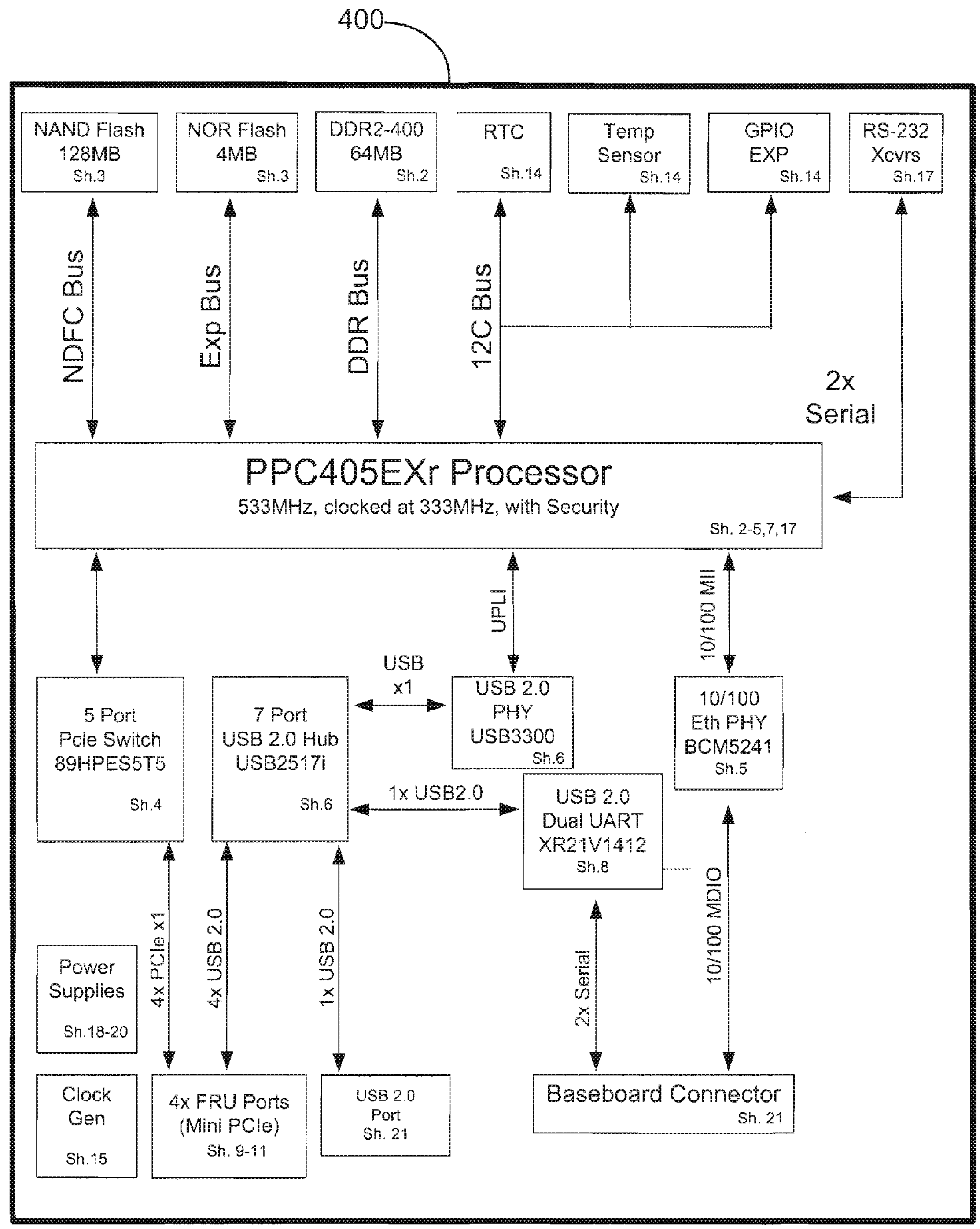
FIG. 4 schematically shows operative circuitry for an intelligent communications device according to one or more embodiments of the present invention.

Referring to FIG. 4, an exemplary outlay 400 of an intelligent communications device 102 is shown, according to one embodiment of the present invention. The internal configuration of the apparatus 400 may include a NAND flash, a NOR flash, a RAM, Temperature sensor, a, RTC, a GPIO, and an interface circuitry such as RS232 coupled to the processor, such as PPC405 EXr Processor. Additionally, a plurality of ports may be interfaced with the processor, such as USB ports, Ethernet ports, switch input connectors, and/or hubs. The circuitry may receive AC/DC power from the power supply, and the power supply may deliver different voltages such as +5V, −5V, +12V, −12V, +15V, −15V and other voltages. Various connectors may be utilized for connecting different type of active and passive components. A clock generation circuitry may be provided for servicing circuits requiring clock pulses.

In an embodiment of the present invention, integrated circuits may be utilized for assembling the embodiment shown in FIG. 4 in association with other active and passive electronic components. Additionally, the circuitry may be laid on a multiple tier PCB for laying the passive and active electronic components and circuits.

Managing Uncertain Events

Figure 5:
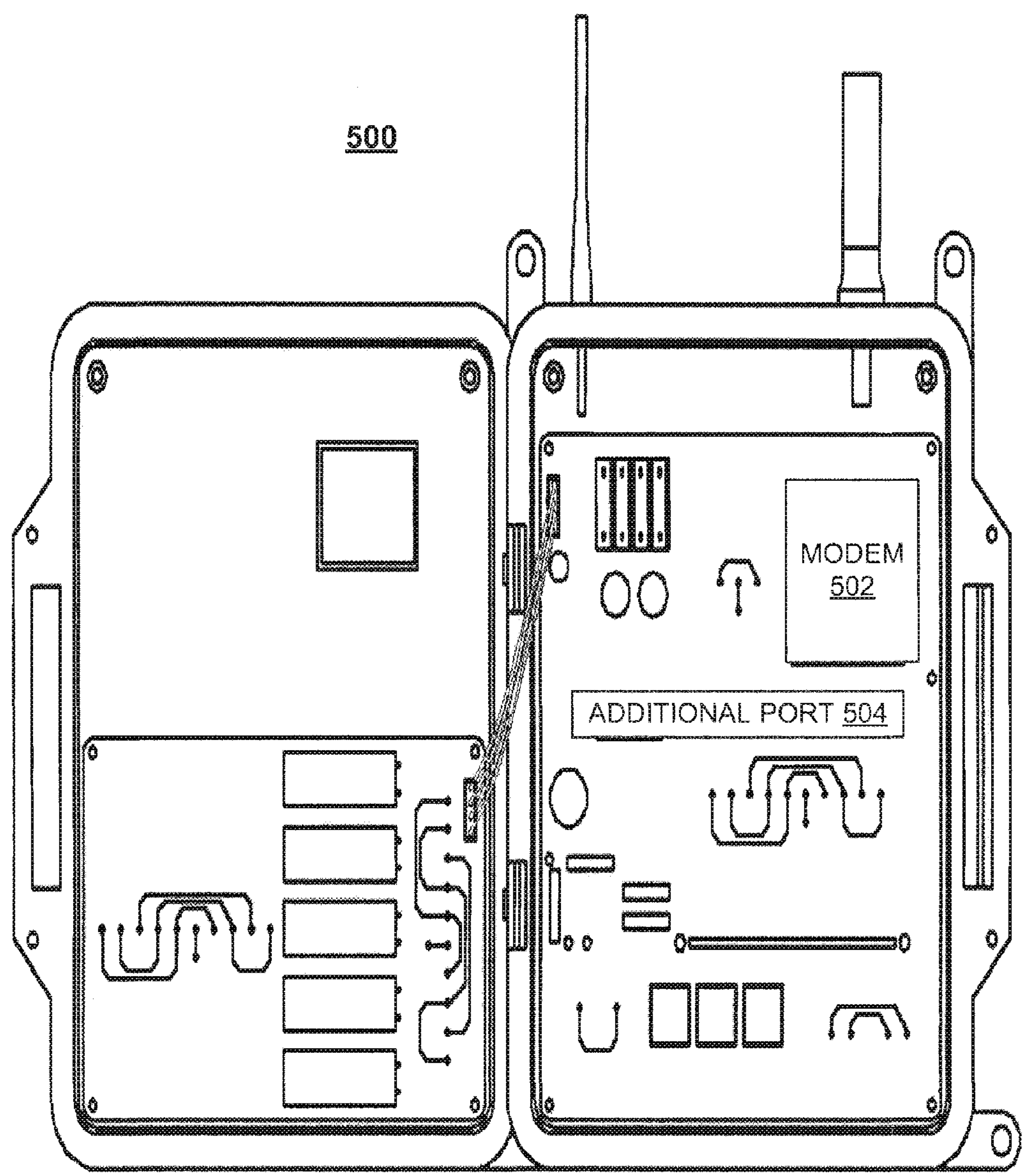
FIG. 5 schematically shows an apparatus for managing a network connection of an intelligent communications device, according to one embodiment of the present invention.

Now referring to FIG. 5, the intelligent communication device 102 may include a modem 502, an additional port 504, and a plurality of scripts to connect to a communications network. As shown in the embodiment of FIG. 5, the modem 502 and additional port 504 are provided within a dedicated utility-grade enclosure. Alternatively, the components may be operatively installed within the enclosure for one or more other communications apparatus or smart grid-related components. For instance, the circuitry may be installed in a larger utility-grade enclosure designed for housing circuit breaking in connection with utility power lines. The network connection may be monitored at regular time intervals to determine the state of the network connection. A script may be executed by the processor 310 to verify the state of the network connection. The kernel may run one or more scripts as background processes. In an embodiment of the present invention, the kernel may be built from an open source code that may initiate one or more scripts for monitoring the network connection. For example, the intelligent communication device 102 may connect to the network through a dial-in connection via Point-to-Point Protocol (PPP). In this example, the open source code utilized for building a kernel may load a PPP driver and the PPP driver may then initiate pppd (point-to-point daemon), which may be entrusted with the task of monitoring the network connection.

The apparatus 102 may boot by initiating a number of operative processes, which are usually controlled by the operating system. Processes that run in the background generally do not require any intervention from the user are referred to as 'background processes'. The process of scanning the availability of the network may involve setting up of a point-to-point protocol for forming a serial link to the point-to-point server. In an embodiment of the present invention, the operating system is operative to initiate a point-to-point link through an operating system such as WINDOWS, Linux, or MACINTOSH.

In an embodiment of the present invention, the operating system may be open source software such as Linux. In this aspect, the pppd daemon may function in synchronization with the ppp driver to initiate a process of establishing a connection between the modem and the server or any other communication device over a communication channel. Additionally, pppd may also authenticate the connection between one or more devices in the network. In an embodiment of the present invention, the pppd can be used with other network protocols apart from internet protocol, although in this embodiment, internet protocol is being utilized for establishing a connection.

In an embodiment of the present invention, the process of establishing a connection to a server may be initiated. At first, the process determines whether there exists a link between the network communication device and the server. If no existing link is found between the network communication device and the server, the process of establishing a connection may be initiated. The initiation of a link establishment phase involves negotiation of a connection using a Link Control Protocol.

As described above, the intelligent communication device 102 may include a memory 308, a communication module 304, and a plurality of scripts. The script may be stored in the memory 308 associated with the intelligent communication device 102, which may be executed by the processor 310. Multiple scripts may be executed in parallel to form a multi-threaded environment. Further, the processor 102 may provide for inter-process communication among different scripts. In an embodiment of the present invention, the one or more scripts may be executed in parallel to monitor one or more network connections. Such an implementation may be in a multi-tasking environment. In addition, the first script may be executed as 'parent script', where the parent script may spawn a number of child processes that may continue to execute even after the termination of the parent script. The parent script may include program code for execution of child scripts, which may be executed based on pre-specified conditions.

A PPP connection may facilitate establishment of connection between the one or more devices for exchanging packets. In an embodiment of the present invention, the PPP protocol may be modified to accommodate a plurality of hosts, bridges, and/or routers.

In an embodiment of the present invention, the PPP encapsulation may provide multiplexing of different network-layer protocols simultaneously over an established link. The PPP encapsulation is modifiable in implementation to support multiple type of hardware.

In an embodiment of the present invention, an encapsulated form of point-to-point protocol may be implemented to detect the network connection. Point-to-Point over Ethernet (PPPoE) and Point-to-Point Protocol over ATM (PPPoA) may be utilized by the Internet Service Provider (ISP) for connecting a Digital Subscriber Line (DSL) to the internet. Suitable modification to the open source code kernel may be implemented for accomplishing this aspect, for detecting the network connection.

In an embodiment of the present invention, a PPP protocol may be modified to adapt to the existing network protocols. For example, assignment of IP addresses may be difficult in a circuit-switched network, so additional functionality may be embedded in the PPP protocol to enable adaptive configuration with existing network protocols.

In one implementation of the PPP protocol, eight octets may be utilized for encapsulation, when used within the default HDLC-type framing. In an alternate implementation, the framing may be reduced to 2 to 4 octet in a low bandwidth environment.

To support high speed data transfer, the PPP protocol may utilize simple fields for encapsulation, and in one embodiment, only one field may be examined for demultiplexing.

In order to provide operational uniformity for connection management in different environments, and to mange, configure and terminate a connection, the PPP protocol may provide a link control protocol. The link control protocol may be entrusted with the task of automatically agreeing upon the encapsulation format options, handling varying limits on sizes of packets, detecting a looped-back link and other common mis-configuration errors, and terminating the link.

In another embodiment of the present invention, the configuration management with other devices, servers, and wireless devices may be automated. For implementing automated configuration, the configuration parameters may be requested from the pairing device. Alternatively, the automated configuration may be implemented using option negotiation mechanisms.

In an embodiment of the present invention, the parent script may spawn a child process for authenticating the network connection before establishing the network connection.

The additional port 504 may facilitate the monitoring of the network connection. In an embodiment of the present invention, the additional port 504 may be a serial port, a parallel port, a USB port, or a logical port that may loop back into the intelligent communication device 102 for monitoring the network connection. The additional port 504 may be separate from the port assigned for exchanging data. In an embodiment, the additional port 504 may be associated with a circuitry that may provide the feedback to the intelligent communication device about the state of the network connection. Various parameters associated with the network, including bandwidth, bit rate, baud rate, and signal strength may be utilized for verifying the network state.

In an embodiment of the present invention, the additional port 504 may be on an external device separate from the apparatus 102. The external device may verify the state of network connection by sending a test signal to apparatus 102. In addition, the external device may receive information about the state of the network connection from the apparatus 102. The signal may be analyzed to determine a true state of the network connection. Based on the input from the external device, a control signal may initiate one or more scripts for reconnecting the intelligent communication device 102 to the network. In an alternate embodiment, the control port may be integrated in the intelligent communication device 102 and may independently monitor the network connection.

In one embodiment, the modem includes specific control circuitry. The control circuitry may be associated with the additional port 504 that may continuously monitor the network connection. In one embodiment, the control circuitry may monitor the network connection at a pre-determined period. This type of discrete monitoring process may be implemented to save processor time, which may be allocated to other important processes. The pre-determined period may vary based on the functionality required for particular situations. For example, the pre-determined period may be selected from a range including one second to 1000 seconds.

The network monitoring port such as the additional port 504 may collect one or more parameters for determining the state of the network connection. For example, the port may determine status of the connection (e.g. connected or disconnected), bandwidth, data transfer rate, and/or packet routing details.

Figure 6:
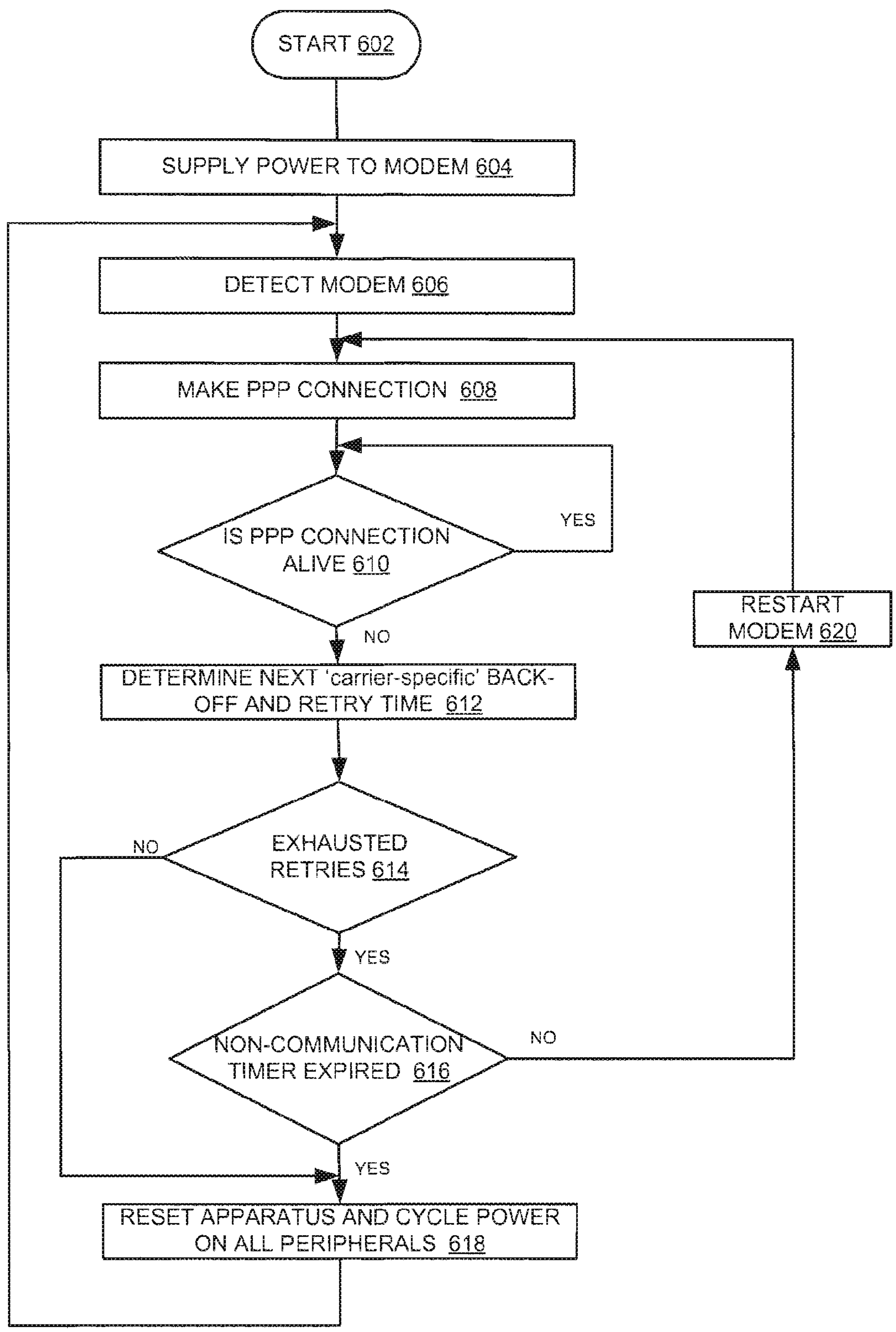
FIG. 6 is a flow chart illustrating operational steps of a method for monitoring, establishing, and maintaining a network connection of an intelligent communications device in a communications network, according to one embodiment of the present invention.

Referring now to FIG. 6, a flow chart shows operational steps of a routine 600 for determining the status of network connection, according to one embodiment of the present invention. The routine is initiated at step 602 and then moves to step 604. At step 604, the modem 502 is provided with the power supply, making it operative. At step 606, the modem 502 executes a process to detect the modem 502. Various methods of determining the active status of modem 502 as known in the art may be provided. For example, modem 502 may be detected by executing an application specifically provided for detecting I/O devices. In another implementation, the kernel and/or operating system may be modified to detect the existence of the modem 502 as soon as it is provided with power supply. In an embodiment, the kernel and/or the operating system of the intelligent communication device 102 may be an open source code kernel modified for performing modem 502 operations. Immediately after successful detection of modem 502, the operating system and/or open source code kernel loads a PPP driver, which may be fetched from the memory 308 for execution. The PPP driver initiates a PPP daemon (pppd) for establishing a ppp connection. Subsequently, at step 608 a ppp connection may be established.

At step 610, the routine 600 iteratively loops back to check whether the established ppp connection is active. If at the step 610 it is determined that the ppp connection is inactive (i.e. no network connection is found), operation moves from the iterative loop to step 612. At step 612, a table of carrier-specific back-off and retry time is provided. In an embodiment of the present invention, the table may be stored in a flat file, a text file, a memory, and/or a database. The routine 600 reads the table entries to determine the back-off and retry time. The back-off and retry time refers to the time that the routine 600 needs to wait before making an attempt to connect again to the network. It may be noted that the specific back-off and retry time(s) may vary according to factors such as bandwidth, channel characteristics, and/or carrier specific parameters.

Subsequently, the routine 600 moves to step 614. At step 614, a count of the number of retries already attempted is determined. If the number of tries is at least equal to the threshold value for a particular carrier, then the routine 600 proceeds to step 616. Otherwise, the routine 600 proceeds to step 618.

In an embodiment of the present invention, a script for back-off and retry is configured to reestablish the connection of the network communication device. In this embodiment, the script may be programmed to back off for a specific time from attempting to reconnect to the network. For example, a script may be programmed for different specified times such as waiting between one second to several days before making an attempt to connect to the network. In an embodiment, the intelligent communication device 102 may be programmed to back-off for a pre-determined time. Simultaneously, the intelligent communication device 102 may execute another script of higher priority to delay the restart for several days.

At step 616, it is determined if the non-communication timer has expired. If the timer has expired, then the routine proceeds to step 618. If the timer has not expired, then the routine 600 restarts the modem 502 and loops back to step 608, where the routine 600 again attempts to establish the ppp connection. At step 618, the routine 600 restarts all of the attached peripherals before looping back to step 606.

Referring again to step 616, if the specific number of retries has not been exhausted, the routine 600 jumps to step 618. At step 618, the routine 600 restarts all the attached peripheral before looping back to step 606.

The intelligent communication device 102 may include an open source code operating system such as the LINUX operating system, which may spawn several routines simultaneously. These routines may be mutually exclusive, execute in parallel, or may be related to each other as inter routine or communication. Additionally, operating the intelligent communication device 102 in low bandwidth environment may result In an embodiment of the present invention, the routine 600 remains in continuous operation. Further, it may be noted that the routine 600 may be terminated based on a pre-determined condition or may be continuously run as a background routine.

In an embodiment of the present invention, both of the routines may be executed in parallel, and priority may be attached to determine the relative importance of these routines. In an embodiment of the present invention, the priority associated with the routine 600 may be high, medium, and/or low.

Figure 7:
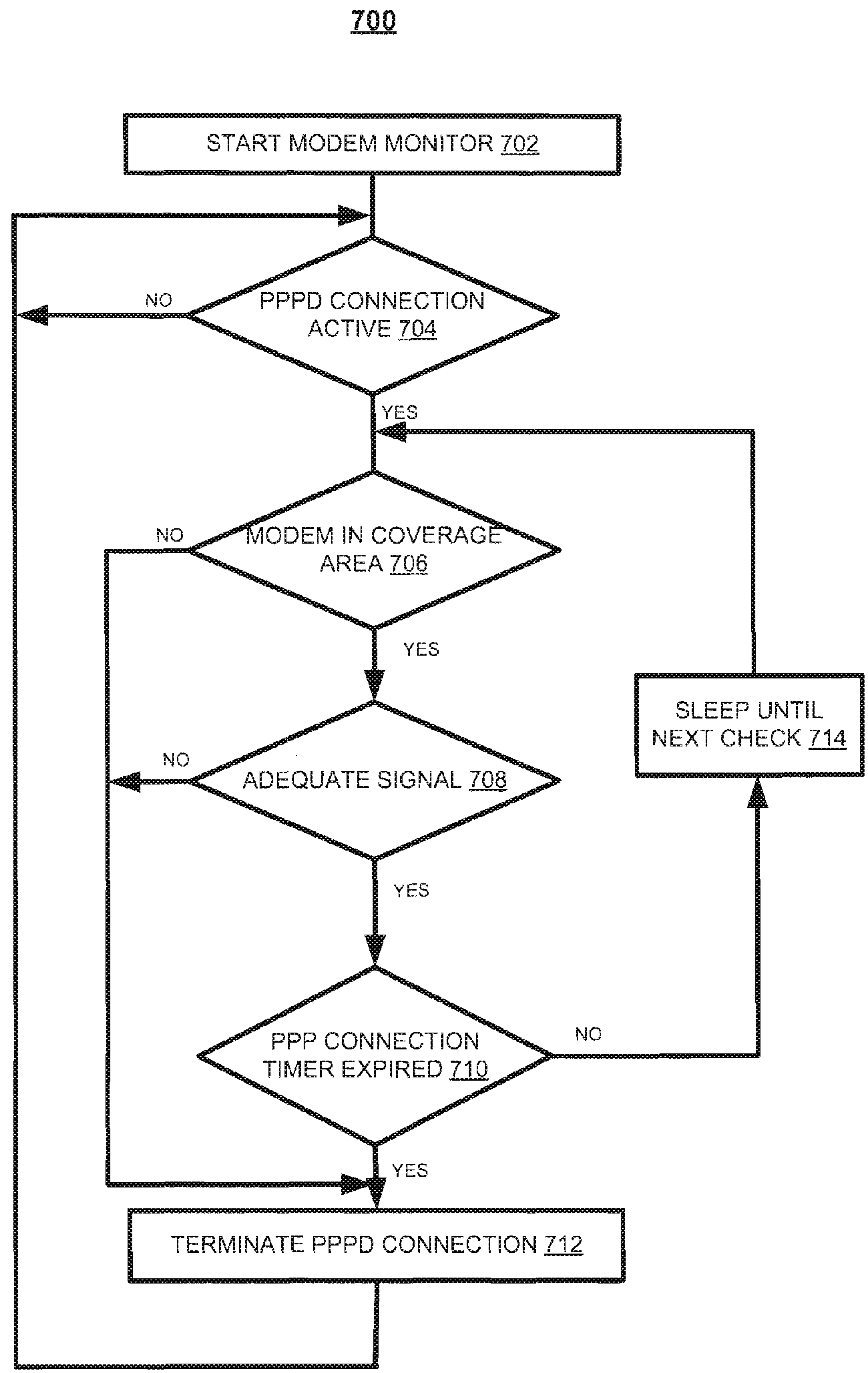
FIG. 7 is a flow chart illustrating operational steps of a method for monitoring operation of a communications device, according to one embodiment of the present invention.
Figure 2:
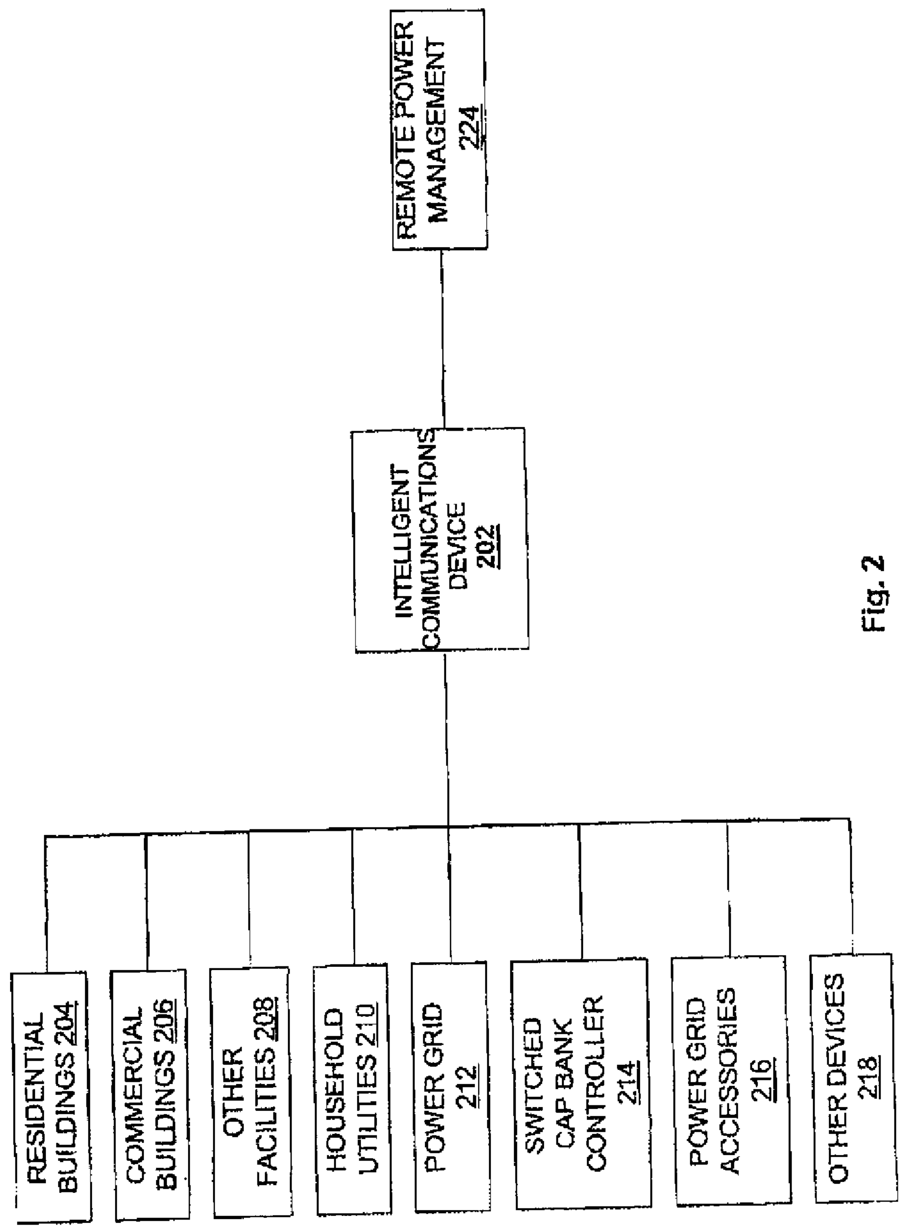

Referring now to FIG. 7, a flow chart illustrates operational steps of a routine 700 for monitoring a communications device, according to an embodiment of the present invention. In the embodiment shown, the routine 700 is initiated at step 702 and then immediately proceeds to step 704. At step 704, the routine 700 may determine if the network connection has been established. In this aspect, the routine 700 may communicate with the routine 600 to check the state of the pppd connection. Alternatively, the routine 700 may inquire the status of the pppd connection through another routine or through inter-routine communication to verify the existence of the network connection. In an embodiment of the present invention, the connection establishment routine 600 and the modem monitoring routine 700 may communicate with each other via kernel. Alternatively, the connection establishment routine 600 and the modem monitoring routine 700 may communicate through an operating system.

If the pppd connection is active, the routine 700 may proceed to step 706. Otherwise, the routine 700 may loop back to the step 704 until the network connection has been established; this may be accomplished by checking the state of the pppd connection.

The routine 700 may proceed to another step 706. At step 706, the routine 700 may determine whether the modem 502 is within the coverage area. If the modem is found to be in the coverage area then it may proceed to step 708. Otherwise, the routine 700 may move to step 714.

If the modem 502 is found to be within the coverage, the strength of signal may be determined step 708. At step 708, the Relative Signal Strength Indicator (RSSI) may be determined. If the RSSI is below a minimum threshold level then the routine 700 may jump to 714. The determination of RSSI may be performed in the intermediate frequency (IF) stage before the IF amplifier. In an embodiment, the RSSI may be a DC analog value. In an alternate embodiment of the present invention, the RSSI may be sampled by an internal ADC (Analog-to-Digital Convertor) and the code obtained thereafter may be utilized for determining the value of the RSSI. In another embodiment of the present invention, the RSSI may be determined through a circuitry associated with wireless network card to determine the amount of radio energy in a signal. In an embodiment, the RSSI may be visualized on a user interface through network monitoring tools. The measurement of RSSI may be without unit and only a numeric value may be assigned to it. If the RSSI is above the threshold value, the routine 700 may progress to 710. Otherwise, the routine 700 may proceed to step 714.

At step 710, the state of the ppp connection timer is determined. If the ppp connection timer has expired, the routine 700 may proceed to step 712. At step 712, the routine 700 may terminate the pppd connection and loop back to the step 704. Otherwise, the routine 700 may sleep for a pre-determined time (step 714) before looping back to step 706. The routine 700 may continue to run infinitely unless the operating system initiates a forced shutdown.

In another embodiment of the present invention, the routine 700 may be executed after a fixed internal of time, if it is established that a permanent network connection exists for a pre-determined time. Such functionality may save CPU time, which may then be utilized for other priority routines.

The methods described herein may be deployed in part or in whole through one or more devices that are capable of executing computer software, program codes, and/or instructions on corresponding processors. A processor may be part of a server, client, network infrastructure, mobile computing platform, stationary computing platform, or other computing platform. The processor may be any kind of computational or processing device capable of executing program instructions, codes, and/or binary instructions. The processor may be or may include a signal processor, a digital processor, an embedded processor, a microprocessor or any variant such as a co-processor (e.g. a math co-processor, a graphic co-processor, or a communication co-processor) that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program and instructions described herein may be implemented in one or more threads. A thread may spawn other threads that may have assigned priorities associated with them; the processor may execute these threads based on a priority or any other order based on instructions provided in the program code. The processor may include memory that stores methods, codes, instructions, and programs as described herein and elsewhere. The processor may access a storage medium through an interface that may store methods, codes, and instructions as described herein and elsewhere. The storage medium associated with the processor for storing methods, programs, codes, program instructions or other types of instructions capable of being executed by the computing or processing device may include, but may not be limited to, one or more of a CD-ROM, DVD, hard disk, flash drive, RAM, ROM, and/or cache.

The processor may include one or more cores that may enhance speed and performance of a multiprocessor. In embodiments, the process may be a dual core processor, quad core processors, or other chip-level multiprocessors that combine two or more processors.

The methods and systems described herein may transform physical and/or or intangible items from one state to another. The methods and systems described herein may also transform data representing physical and/or intangible items from one state to another.

The elements described and depicted herein, including the elements described in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipments, servers, and/or routers. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application-specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the embodiments shown and described in detail, various modifications and improvements thereon will become readily apparent to those skilled in the art. Accordingly, the spirit and scope of the present invention is not to be limited by the foregoing examples.

What is claimed is:

1. An apparatus for managing network connection of an intelligent communications device, comprising:

a communication module that is operative to monitor the network connection through a first port that is independent of a network port, the first port associated with a computer-executable application, wherein the computer-executable application is operative to detect a failure of the network connection;

a detection module that is operative to detect a failure of the network connection at the network port and, in response to the failure at the network port, cause the computer-executable application and an additional port to reconnect to the intelligent communications device to the communications network; and a power supply module that is operative to iteratively power cycle operation of the computer-executable application until the network connection is re-established, wherein the detection module is further operative to determine if a network device is within network coverage and, if the network device is out of network coverage, power cycle operation of the computer-executable application until the network connection is reestablished.

2. The apparatus of claim 1, wherein the detection module is operative to execute a back-off-and-retry algorithm.

3. The apparatus of claim 1, wherein the detection module further operative to record a number of power cycles that have been performed.

4. The apparatus of claim 1, wherein the network connection comprises a Point-to-Point protocol.

5. The apparatus of claim 1, wherein the network connection comprises a Point-to-Point Tunneling Protocol.

6. The apparatus of claim 1, wherein the network coverage is determined based on a Relative Signal Strength Indicator.

7. The apparatus of claim 1, wherein the function of power cycling comprises restarting the communications device and any associated peripherals.

8. The apparatus of claim 1, wherein the communications device comprises a cellular modem.

9. A method of managing a network connection of an intelligent communications device, comprising:

monitoring the network connection through a first port that is independent of a network port, the first port associated with a computer-executable application that is operative to detect a failure of the network connection;

detecting a failure of the network connection at the network port;

causing the computer-executable application and an additional port to reconnect the intelligent communications device to the communications network in response to the failure at the network port;

determining if a network device is within network coverage; and if the network device is out of network coverage, power cycling operation of the computer-executable application until the network is re-established.

10. The method of claim 9, wherein the computer-executable application includes a back-off-and-retry algorithm.

11. The method of claim 9, further comprising: recording a number of power cycles that have been performed.

12. The method of claim 9, wherein the network connection comprises a Point-to-Point protocol.

13. The method of claim 9, wherein the network connection comprises a Point-to-Point Tunneling Protocol.

14. The method of claim 9, wherein determining if the network device is within the network coverage is based on a Relative Signal Strength Indicator.

* * * * *

UNITED STATES PATENT AND TRADEMARK OFFICE

CERTIFICATE OF CORRECTION

PATENT NO. : 8,645,772 B2
APPLICATION NO. : 12/899486
DATED : February 4, 2014
INVENTOR(S) : Edward G. Howard et al.

It is certified that error appears in the above-identified patent and that said Letters Patent is hereby corrected as shown below:

In the Drawings

Delete Drawing Sheet 2, and replace with Drawing Sheet 2. (attached)

Signed and Sealed this
Third Day of June, 2014

Michelle K. Lee

Michelle K. Lee
*Deputy Director of the United States Patent and Trademark Office*